US006293764B1

(12) United States Patent
Baumann

(10) Patent No.: US 6,293,764 B1
(45) Date of Patent: Sep. 25, 2001

(54) RECIPROCATING COMPRESSOR WITH DRY LUBRICATING SYSTEM

(75) Inventor: Heinz Baumann, Winterthur (CH)

(73) Assignee: Greenfield AG, Basel (CH)

(*) Notice: Subject to any disclaimer, the term of this patent is extended or adjusted under 35 U.S.C. 154(b) by 0 days.

(21) Appl. No.: 09/341,746

(22) PCT Filed: Jan. 17, 1997

(86) PCT No.: PCT/CH97/00015

§ 371 Date: Jul. 15, 1999

§ 102(e) Date: Jul. 15, 1999

(87) PCT Pub. No.: WO98/31936

PCT Pub. Date: Jul. 23, 1998

(51) Int. Cl.[7] ................................ F04B 1/04; F04B 3/00; F16J 1/04; F16J 9/00

(52) U.S. Cl. .................... 417/273; 417/255; 417/DIG. 1; 92/248; 92/212; 92/252; 92/253

(58) Field of Search .................................... 417/273, 244, 417/255, DIG. 1; 92/248, 212, 252, 251, 253

(56) References Cited

U.S. PATENT DOCUMENTS

| | | | | |
|---|---|---|---|---|
| 2,261,405 | * | 11/1941 | Nicolle | 309/14 |
| 3,155,014 | * | 11/1964 | Genz | 92/244 |
| 3,490,683 | * | 1/1970 | Kocher | 230/43 |
| 4,270,439 | * | 6/1981 | Ponchaux | 91/495 |
| 4,313,714 | * | 2/1982 | Kubeczka | 417/273 |
| 4,466,399 | * | 8/1984 | Hinz et al. | 123/193 CP |
| 4,619,592 | * | 10/1986 | Bender | 417/429 |
| 4,627,795 | * | 12/1986 | Schmitz-Montz | 417/267 |
| 4,846,051 | * | 7/1989 | Wade | 92/127 |
| 4,957,416 | * | 9/1990 | Miller et al. | 417/273 |
| 4,986,231 | * | 1/1991 | Brown | 123/123 P |
| 4,986,234 | * | 1/1991 | Bell | 123/193 CP |
| 5,030,065 | * | 7/1991 | Baumann | 417/273 |
| 5,033,940 | * | 7/1991 | Baumann | 417/273 |
| 5,493,953 | | 2/1996 | Bolthouse | 92/165 |
| 5,632,605 | | 5/1997 | Bez | 417/266 |

FOREIGN PATENT DOCUMENTS

| | | | |
|---|---|---|---|
| 1302968 | | 1/1971 | (DE) . |
| 2534001 | * | 2/1977 | (DE) . |
| 1373438 | | 11/1974 | (GB) . |
| 1566576 | | 5/1980 | (GB) . |
| 2141491A | | 12/1984 | (GB) . |

OTHER PUBLICATIONS

Feistel, Norbert, "Round the world twice—without lubrication" in: Sulzer Technical Review, vol. 78, No. 4, Sep. 1996, pp. 42–45.

* cited by examiner

*Primary Examiner*—Charles G. Freay
*Assistant Examiner*—Timothy P. Solak
(74) *Attorney, Agent, or Firm*—Townsend and Townsend and Crew LLP

(57) ABSTRACT

The compressor contains at least one piston (5) guided in a dry-running manner which, together with a cylinder insert (33), bounds a ring gap which is open over the common longitudinal section in each case and permits a leakage flow of the compressed medium. The piston (5) is coupled via a piston rod (42) to a support part (38) which is displaceably guided in the direction of its longitudinal axis (6) and is connected to a drive device. The piston rod (42) cooperates with the piston (5) and the support part (38) via support surfaces (43) which are convex at the end faces and permit relative movements of the support part (38) with respect to the piston (5) which extend transversely to the longitudinal axis (6). Accordingly, a parallel guidance of the piston (5) in the cylinder insert (33) is achieved which is not influenced by oscillations of the driving parts. The piston (5) has a metallic basic body (61) and a sleeve member (62) made of a plastic material on which the running surface of the piston (5) is formed. The cylinder is manufactured of a material whose coefficient of thermal expansion corresponds at least approximately to a resultant coefficient of thermal expansion of the materials of the basic body (61) and of the sleeve member (62). The compressor in accordance with the invention is particularly suitable for the oil-free compression of a gas.

12 Claims, 2 Drawing Sheets

RECIPROCATING COMPRESSOR WITH DRY LUBRICATING SYSTEM

The invention relates to a reciprocating piston compressor.

BACKGROUND OF THE INVENTION

In a reciprocating piston compressor of the named type known from the Baumann U.S. Pat. No. 5,033,940 the piston and the cylinder are each executed with a running surface of an abrasion-resistant material, with the piston being supported via a roller body, e.g. a ball, on a connection part coupled to a drive device and movably guided in the cylinder transversely to the longitudinal axis. A dry running split-ring seal which permits a predetermined leakage flow of the compressed medium is achieved through the known embodiment in particular for short-stroke small compressors. For this the abrasion-resistant materials of the piston and of the cylinder must be chosen in such a manner that they have at least approximately the same coefficient of thermal expansion in order to keep the leakage loss substantially constant during operation.

SUMMARY OF THE INVENTION

The object of the invention is to provide a further developed reciprocating piston compressor of the initially named kind suitable for embodiments having dimensions selectable within a relatively large bandwidth in a simple, economical to manufacture design which permits the formation of a dry running split-ring seal with low constructional complication and expense even for relatively long-stroke embodiments and which ensures a constant leakage flow.

The thermal expansion of the piston can be influenced and matched to the coefficient of thermal expansion given by the cylinder material used for the cylinder part surrounding the piston, i.e. held within a predetermined expansion range in a particularly simple, economical manner. This is achieved through the combination, provided in accordance with the invention, of a piston having a metallic basic body and with a sleeve member of plastic encompassing the latter with a cylinder surrounding the piston with a ring gap in that the choice of material and the ratio of the partial cross-sections of the basic body and of the sleeve member are matched to one another in accordance with a predetermined resultant thermal expansion of the two piston parts. Accordingly, a dry running split ring seal with a substantially constant, minimum clearance between the piston and the cylinder can be achieved so that a contact-less guiding of the piston which is free from lateral forces can be ensured within a relatively large, operationally predetermined, temperature range. The material combination provided in accordance with the invention is also suitable for embodiments with relatively high piston speeds, with the sleeve member, which is made of plastic, in particular preventing a blocking of the piston even in the case of a failure of the split ring seal. A high operational security of the compressor is thus ensured. The plastic of the sleeve member can in addition be doped with a dry lubricant, e.g. polyphenylene sulphide (PPS), polytetrafluoroethylene (PTFE), polyethylene (PE) or the like. A particular advantage of the execution in accordance with the invention consists in the fact that the described, substantially contact-free guidance of the piston can be achieved with simple means, in particular without an additional complicated and expensive guide apparatus and using economical, relatively easy to work materials. Accordingly, economical embodiments can also be realised with relatively large piston/cylinder and/or stroke dimensions.

BRIEF DESCRIPTION OF THE DRAWINGS

Further details and features result from the following description of an exemplary embodiment of the invention schematically illustrated in the drawings. Shown are.

DESCRIPTION THE PREFERRED EMBODIMENT

Figure 1:
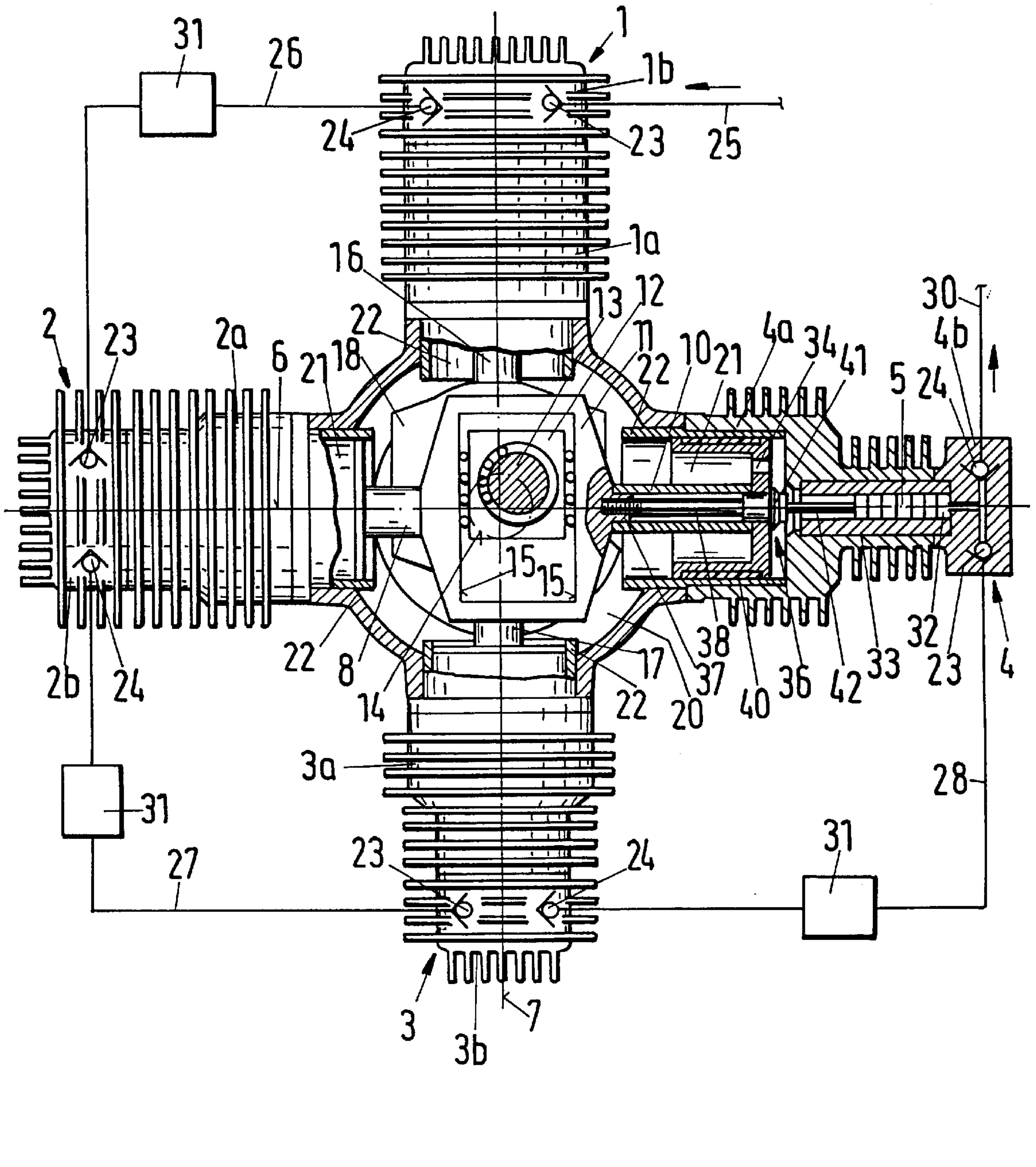
FIG. 1 is a reciprocating piston compressor executed in accordance with the invention in a plan view with a horizontal partial section.

The reciprocating piston compressor illustrated, a four-stage compressor for the oil-free compression of a gas, contains four horizontally arranged cylinders 1, 2, 3 and 4 connected in series with pistons guided therein, of which only one piston 5 guided in cylinder 4 is illustrated. The cylinders 2 and 4 are centered on a common horizontal axis 6 lying in the plane of the drawing, whereas the cylinders 1 and 3 are centered on a common horizontal axis 7 displaced backwards with respect to the plane of the drawing. The pistons of the cylinders 2 and 4 are each coupled to a sliding member 12 via a guide part 8 or 10 respectively movable in the direction of the axis 6 and a yoke 11 connecting the latter. The sliding member 12 is journalled on a crank pin 13 of a vertically arranged crankshaft 14 and guided in displacement transversely to the axis 6 between two guide paths 15 formed in the yoke 11. The pistons of the cylinders 1 and 3 are each coupled via a guide part 16 or 17 respectively and a second yoke 12 connecting them to a non-illustrated second sliding member which is journalled on the crank pin 13 and is in displacement guided transversely to the axis 7 in the second yoke 18, which is displaced with respect to the first yoke 11 by 90°. The crankshaft 14 is arranged in a central crankshaft space 20 of the compressor housing and connected by a clutch to a non-illustrated motor, e.g. to an electric motor.

The guide part 10 is guided via a connection part 21 in a sleeve 22 which is open with respect to the crankshaft space 20 and is arranged in a housing part 4*a* of the cylinder 4. The guide parts 8, 16 and 17 are each guided in a corresponding manner via a non-illustrated connection part in a sleeve 22 which is arranged in a housing part 2*a*, 1*a* or 3*a* of the relevant cylinder 2, 1 or 3 respectively.

The pistons each bound a compression chamber in the cylinders 1, 2, 3 and 4 which is in connection with two non-return valves—a suction valve 23 and a pressure valve 24—arranged at the corresponding cylinder head 1*b*, 2*b*, 3*b* or 4*b* respectively. The suction valve 23 of the cylinder 1 forming a first compression stage can be connected via a suction line 25 to a source of a gas to be compressed. The pressure valve 24 of the cylinder 1 is connected via a connection line 26 to the suction valve 23 of the cylinder 2 forming the second compression stage. The pressure valve 24 of the cylinder 2 is connected in a corresponding manner via a connection line 27 to the suction valve 23 of the cylinder 3 forming the third compression stage, of which the pressure valve 24 is connected via a connection line 28 to the suction valve 23 of the cylinder 4, which is designed for the final pressure. The pressure valve 24 of the cylinder 4 is connected to a pressure line 30 leading away from the compressor. The connection lines 26, 27 and 28 each contain heat exchange 31 for cooling the gas to be conducted to the respective following compression stage.

The pistons are each guided in a dry running manner in the cylinders 1, 2, 3 and 4. The pistons guided in the cylinders 1, 2 and 3 can, as is known e.g. from the initially named Baumann U.S. Pat. No. 5,033,940, each be provided with a non-illustrated seal arrangement and with a guide ring of a material suitable for dry running, e.g. Teflon. These pistons can be rigidly connected to the associated yoke 11 or 18 respectively via the guide parts 8, 16 and 17, which each form a piston neck.

The piston 5 of the compressor stage designed for the final pressure is guided in a cylinder insert 33 which is arranged in the cylinder 4 and whose bore together with the piston 5 bounds an open ring gap which is open in each case over the entire common length and which permits a predetermined leakage flow of the gas compressed in the compression chamber 32 of the cylinder 4 in the direction towards the connection part 21. A passage aperture 34 arranged in the connection part 21 permits the leakage gas to flow into the crankshaft space 20, from which the leakage gas can be led off via a non-illustrated discharge or flow-off line and, where appropriate, can be supplied to the suction line 25. The piston 5 is coupled to the yoke 11 via a holder 36 which permits relative movements of the guide part 10 which is rigidly connected to the yoke 11 and of the connection part 21 which is transverse to the longitudinal axis 6 of the piston 5. The running surface of the cylinder insert can be provided with a layer of hard material, e.g. a layer of an amorphous diamond-like carbon (ADLC), titanium nitride or the like.

The guide part 10 is formed in the shape of a sleeve which can be pushed onto a centering pin 37 of the yoke 11 and on which the connection part 21 is mounted. The connection part 21 is formed in the shape of a pot-like guide piston having a jacket surface which can, as illustrated, be provided with a guide ring 40 of a self lubricating material suitable for dry running, e.g. Teflon or poly(ether ether ketone) (PEEK). The holder 36 contains a support part 38 which passes through the connection part 21 and the guide part 10 and can be screwed into the yoke 11. The support part 38 has a head part 41 which can be clamped relative to the connection part 21 and the guide part 10, and a support element which is movable transversely to the longitudinal axis 6 of the cylinder 4, or the piston 5, and has the form of a piston rod 42 which can be inserted between the head part 41 and the piston 5 and which is held at the piston 5 and in the head part 41 so that it can be inclined to all sides.

Figure 2:
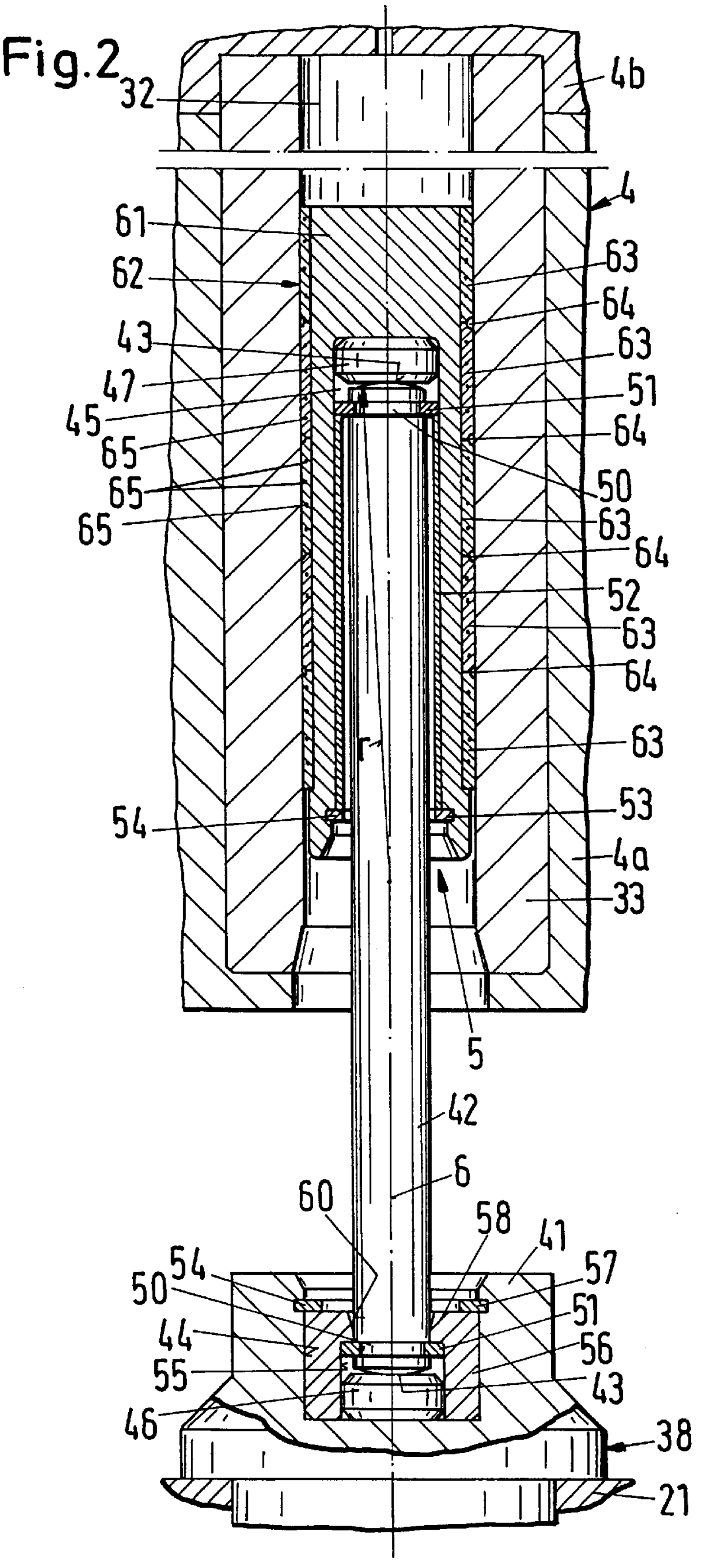
FIG. 2 is a detail of the reciprocating piston compressor of FIG. 1 in an enlarged representation.

As is seen from FIG. 2 the piston rod 42 is provided with convex support surfaces 43 in the form of spherical sections formed at its end faces and is braced via them on seating parts respectively arranged in the head part 41 and in the piston 5. The support surfaces 43 can each be executed with a radius of curvature r, as illustrated, which essentially corresponds to half the length of the piston rod 42 and which permits in each case a rolling off movement of the relevant support surface 43 on the seating part which is free of sliding friction. Through this relatively large radius r of the spherical section a relatively low surface pressure can be achieved in the rolling off region and thus a correspondingly favourable stressing of the cooperating surface parts is ensured. The seating parts can be formed on two bearing parts 46 and 47, as illustrated, each of which is arranged in a respective axial blind bore 44 or 45 of the head part 41 or of the piston 5. The bores 44 and 45 are executed in such a manner that they permit deflection movements of the piston rod 42 to all sides, with the bore 45 of the piston 5 having such a depth that the penetration depth of the piston rod 42 corresponds to at least about one half the length of the piston 5, in the illustration approx. ¾ of the length of the piston 5. The piston 5, which is movably held in the region of its head, can thereby automatically assume a position in each case which enables the leakage gas to flow about it on all sides. The bore 44 of the head part 41 is illustrated for the reception of a holder ring 56 surrounding the bearing part 46. The bearing parts 46 and 47 can each be made of a hardened steel or be provided with a seating surface of an abrasion resistant material, e.g. of hard metal.

The piston-side end of the piston rod 42 is guided in the bore 45 of the piston 5 by a resilient snap ring 51 which is arranged in a ring groove 50 of the piston rod 42 and permits deflection movements of the piston rod 42 through rolling off movements of the support surface 43 on the bearing part 47. The snap ring 51 is held by a spacer sleeve 52 which can be inserted into the bore 45 and is supported on a resilient support ring 54 which can be inserted into an inner groove 53 of the piston 5 and through which the piston rod 42 is held to lie in contact with the bearing part 47. The other end of the piston rod 42 is held by a correspondingly arranged second snap ring 51 in the holder ring 56 which is arranged in the bore 44 of the head part 41 and which is secured by a second support ring 54 which can be inserted into an inner groove 57 of the head part 51. The holder ring 56 is illustrated to be executed with a bore 55 which has an offset shoulder part 58 intended for the reception of the snap ring 51 and an end section 60 which conically diverges therefrom in the direction towards the piston 5 and which permits corresponding deflection movements of the piston rod 42 through rolling movements of the support surface 43 on the bearing part 46.

In deviation from the illustrated embodiment the head part 41 can also be provided with a bore 44 which extends more deeply into the support part 38 and thereby enables the reception of a correspondingly longer end section of the piston rod 42. A longer piston rod 42 with a correspondingly larger radius r of the seating surfaces 43 can thereby be used where appropriate. An embodiment is also possible in which the piston 5 is provided with a bore 45 having a depth which, e.g., corresponds to that of the bore 44 of the head part 41 of the illustrated embodiment.

The piston 5 has a metallic basic body 61, e.g. one made of a Ni—Fe alloy and a sleeve member 62 which at least partially surrounds the former, illustrated to do so substantially over the entire length, and which is made of a plastic material, e.g. of a poly(ether ether ketone) (PEEK) and on which the running surface of the piston 5 is formed. The materials of the piston 5 and of the cylinder insert 33 receiving it are matched to one another in such a manner that the coefficient of thermal expansion of the cylinder material at least approximately corresponds to a coefficient of the piston 5 resulting from the combination of the coefficients of thermal expansion of the materials of the basic body 61 and of the sleeve member 62. Thus a compressor embodiment with a ring gap between the piston 5 and the cylinder 4, or cylinder insert 33, which remains constant over a predetermined temperature range can be realised through a combination of materials, each having a different thermal expansion behaviour.

The sleeve member 62 can be executed in the form of a sleeve which can be shrunk onto the basic body 61 and extends over its entire length, or, as illustrated in FIG. 2, assembled of a plurality of ring sections 63 which can each be mounted or pressed onto the basic body 61 adjacent to one another. The sleeve member 62 can furthermore be executed with a plurality of ring grooves 64 which are mutually displaced in the axial direction and are illustrated to be formed by the ends of the ring sections 63 which lie in contact with one another. The ring grooves 64 enable a uniform distribution of the pressure which is present in the ring gap and which, in each case, is dissipated in the narrow gap between the ring grooves 64.

As is further seen in FIG. 2, the sleeve member 62, or each of the ring sections 63, can be provided with a reinforcing structure of a plurality of long fibers 65, each of which is arranged in a plane extending substantially transverse to the longitudinal axis 6 of the sleeve member 62. The long fibers 65, which are carbon fibers in the embodiment shown, can, as indicated in FIG. 2, in each case be arranged in a winding passing through the sleeve member 62 in the peripheral direction. Alternatively, in accordance with a different, non-illustrated embodiment, the long fibers can be arranged in each case in an areal structure which is formed of a plurality of long fibers pieces each crossing the other in a plane extending transverse to the longitudinal axis 6. By means of the described reinforcement structure it can be ensured that the sleeve member 62, which is executed as a single piece or of a plurality of pieces, lies firmly in contact with the basic body 61, even at high operating temperatures, since the long fibers 65, in particular carbon fibers, have a substantially lower coefficient of thermal expansion than the plastic of the sleeve member 62. Accordingly, as previously described, a resultant thermal expansion of the piston 5 which is matched to the thermal expansion of the cylinder insert 33 can be achieved.

The yoke 11 is displaceably guided in the housing of the compressor in the direction of the longitudinal axis 6 by the two connection parts 21 and connected without play in the direction of the longitudinal axis 6, via the previously described support arrangement, to the piston 5 which is subjected to the corresponding end pressure. At the same time the transmission of transverse forces from the yoke 11, which is slidingly guided by the connection parts 21 with a corresponding lateral clearance, to the piston 5 is prevented by the described support arrangement. Thus a parallel guidance of the piston 5 within the cylinder 4, or the cylinder insert 33, can be achieved which is not influenced by oscillations of the yoke 11. Accordingly, relatively long-stroke compressors for high pressures, e.g. of approx. 40 to 1000 bar, can also be made, each having a dry running split ring seal with a ring gap that remains constant during operation. This ensures a constant leakage flow of the compressed gas enveloping the piston 5 along its entire length and thus a kind of journalling of the piston 5 by the compressed gas. The embodiment described enables the formation of through-flowable ring gaps in compressors in which the difference between the diameter of the bore of the cylinder insert 33 and the diameter of the piston 5 is less than 0.02 mm, e.g. 0.005 mm. The width of the ring gap is determined by the particular leakage loss which develops in operation between the compression chamber 32 and the crankshaft space 20 and is considered acceptable. Depending on the embodiment, an operationally acceptable leakage loss of e.g. less than 10% can be held constant with a minimum of abrasion at the piston 5 and at the cylinder insert 33.

The invention is restricted neither to embodiments of the previously described and illustrated kind, nor to uses in the high pressure range. At least one further compression stage, say the cylinder 3, can also be executed in accordance with the invention in the illustrated example. The embodiment in accordance with the invention is also suitable for other embodiments with one or more stages, e.g. compressors for low temperature technology.

The invention can be described in summary as follows: The compressor contains at least one piston guided in a dry-running manner which, together with a cylinder insert, bounds a ring gap which is open over the common longitudinal section in each case and permits a leakage flow of the compressed medium. The piston is coupled via a piston rod to a support part which is in displacement guided in the direction of its longitudinal axis and is connected to a drive device. The piston rod cooperates with the piston and the support part via support surfaces which are convex at the end faces and permit relative movements of the support part with respect to the piston which extend transversely to the longitudinal axis. Accordingly, a parallel guidance of the piston in the cylinder insert is achieved which is not influenced by oscillations of the driving parts. The piston has a metallic basic body and a sleeve or jacket member made of a plastic material on which the running surface of the piston is formed. The cylinder is manufactured of a material whose coefficient of thermal expansion corresponds at least approximately to a resultant coefficient of thermal expansion of the materials of the basic body and of the sleeve member. The compressor in accordance with the invention is particularly suitable for the oil-free compression of a gas.

What is claimed is:

1. In a reciprocating piston compressor having:

a cylinder having a closed cylinder end, an open cylinder end, and formed about a longitudinal axis;

a piston guided for movement in the cylinder along a running surface of the cylinder for compressing gas in the cylinder between the closed cylinder end and the piston, the piston in the guided movement adjoining the cylinder at a common longitudinal section extending at least partially the length of the piston;

a drive for moving the piston along the longitudinal axis;

a support part movable along the longitudinal axis of the cylinder responsive to the drive;

a support element guided in the direction of the longitudinal axis having a convex surface for driving the piston at one end, extending out the open cylinder end, and having a convex surface for contacting the support part at the other end;

the piston and cylinder forming a narrow ring gap which is open over the common longitudinal section and permits a predetermined leakage flow from the compressed gas in the closed cylinder end to the open cylinder end of the cylinder;

the improvement in the piston and cylinder comprising:

the piston having a metallic basic body having a first thermal coefficient of expansion and a sleeve member including a plastic material having a second thermal coefficient of expansion, the sleeve member enclosing the metallic basic body along at least a part of the length along the longitudinal axis whereby the piston and sleeve have a resultant coefficient of thermal expansion; and, the cylinder having a running surface with a coefficient of thermal expansion equal to the resultant coefficient of thermal expansion of the piston whereby the narrow ring gap which is open over the common longitudinal section permits the predetermined leakage flow of the compressed gas from the closed cylinder end to the open cylinder end over a wide range of operating temperatures of the piston and cylinder.

2. The reciprocating compressor of claim 1 wherein the sleeve includes reinforcement fibers arranged in a plane extending transverse to the longitudinal axis.

3. The reciprocating compressor of claim 2 wherein the reinforcement fibers are carbon fibers.

4. The reciprocating compressor of claim 1 wherein the sleeve member is formed by a plurality of ring sections about the metallic base member.

5. The reciprocating compressor of claim 4 wherein the ring sections form grooves at an outer periphery of the ring sections.

6. The reciprocating compressor of claim 4 wherein:

the sleeve member is pressed around the metallic basic body.

7. The reciprocating compressor of claim 1 wherein:

the compressor includes opposed cylinders and pistons.

8. In a reciprocating pistons compressor having:

a cylinder having a closed cylinder end, an open cylinder end, and formed about a longitudinal axis;

a piston guided for movement in the cylinder along a running surface of the cylinder for compressing gas in the cylinder between the closed cylinder end and the piston, the piston in the guided movement adjoining the cylinder at a common longitudinal section extending at least partially the length of the piston;

a drive for moving the piston along the longitudinal axis;

a support part movable along the longitudinal axis of the cylinder responsive to the drive;

a support element guided in the direction of the longitudinal axis having a convex surface for driving the piston at one end, extending out the open cylinder end, and having a convex surface for contacting the support part at the other end;

the piston and cylinder forming a narrow ring gap which is open over the common longitudinal section and permits a predetermined leakage flow from the compressed gas in the closed cylinder end to the open cylinder end of the cylinder;

the improvement in the piston and support part comprising:

the support element includes a piston rod having a first convex surface for contacting the piston, a second convex surface for contacting the support part and enabling slight transverse movement of the piston relative to the piston rod; and the convex surfaces each have a radius of curvature that is approximately ½ the length of the piston rod.

9. The reciprocating compressor of claim 8 wherein at least one of the ends of the piston rod is received in an axial bore enclosing the piston rod to permit deflection movement of the piston rod.

10. The reciprocating compressor of claim 9 wherein the axial bore is defined at the piston and extends into the piston along the longitudinal axis a distance at least ½ the length of the piston along the longitudinal axis.

11. The reciprocating compressor of claim 9 wherein at least one of the ends of the piston rod acts on a bearing part received in the axial bore.

12. The reciprocating compressor of claim 8 wherein the compressor includes opposed cylinders and pistons.

* * * * *